United States Patent
Gombert et al.

(10) Patent No.: US 10,596,705 B2
(45) Date of Patent: Mar. 24, 2020

(54) MOBILE ROBOT WITH COLLISION ANTICIPATION

(71) Applicant: ABB gomtec GmbH, Seefeld (DE)

(72) Inventors: Bernd Gombert, Wörthsee (DE); Michael Ries, Olching (DE); Leopold Bock-Krausen, Peiting (DE)

(73) Assignee: ABB SCHWEIZ AG, Baden (CH)

( * ) Notice: Subject to any disclaimer, the term of this patent is extended or adjusted under 35 U.S.C. 154(b) by 153 days.

(21) Appl. No.: 15/563,125

(22) PCT Filed: Mar. 31, 2016

(86) PCT No.: PCT/EP2016/000543
§ 371 (c)(1),
(2) Date: Sep. 29, 2017

(87) PCT Pub. No.: WO2016/155885
PCT Pub. Date: Oct. 6, 2016

(65) Prior Publication Data
US 2018/0079079 A1 Mar. 22, 2018

(30) Foreign Application Priority Data
Mar. 31, 2015 (DE) .................. 10 2015 004 087

(51) Int. Cl.
*B25J 9/16* (2006.01)
*G05D 1/02* (2020.01)
(Continued)

(52) U.S. Cl.
CPC ............. *B25J 9/1676* (2013.01); *B25J 5/007* (2013.01); *B25J 9/0018* (2013.01); *B25J 9/0084* (2013.01);
(Continued)

(58) Field of Classification Search
CPC .......... B25J 5/007; B25J 5/005; B25J 9/1676
See application file for complete search history.

(56) References Cited

U.S. PATENT DOCUMENTS

| 4,638,445 A | 1/1987 | Mattaboni |
| 5,758,298 A * | 5/1998 | Guldner ............... G01S 15/931 318/580 |

(Continued)

FOREIGN PATENT DOCUMENTS

| DE | 4408982 | 5/1995 |
| DE | 102013109876 | 3/2014 |

(Continued)

OTHER PUBLICATIONS

Ciocarlie, Matei T. et al. "Towards Reliable Grasping and Manipulation in Household Environments." ISER (2010). (Year: 2010).*

(Continued)

*Primary Examiner* — Ryan Rink

(57) ABSTRACT

The invention relates to a mobile robot having running gear and at least one robot arm mounted on the running gear, a sensor system for sensing obstacles in the surroundings of the robot and a navigation unit for laying down a route along which the running gear can be moved while avoiding the obstacles, and a control unit for the robot arm which is adapted to lay down a permissible position for the robot arm by reference to the obstacles sensed and the route.

10 Claims, 3 Drawing Sheets

(51) Int. Cl.
*B25J 5/00* (2006.01)
*G05D 1/00* (2006.01)
*B25J 9/00* (2006.01)

(52) U.S. Cl.
CPC .......... *B25J 9/0087* (2013.01); *G05D 1/0011* (2013.01); *G05D 1/0251* (2013.01); *G05B 2219/31003* (2013.01); *G05B 2219/39082* (2013.01); *G05B 2219/39085* (2013.01); *G05B 2219/39088* (2013.01); *G05B 2219/40202* (2013.01); *G05D 2201/0217* (2013.01); *Y02P 90/285* (2015.11); *Y10S 901/01* (2013.01)

(56) References Cited

U.S. PATENT DOCUMENTS

| | | | | |
|---|---|---|---|---|
| 9,785,911 | B2* | 10/2017 | Galluzzo | B25J 5/007 |
| 2008/0231221 | A1* | 9/2008 | Ogawa | B25J 5/007 |
| | | | | 318/568.12 |
| 2008/0234864 | A1* | 9/2008 | Sugiura | B25J 9/1666 |
| | | | | 700/255 |
| 2008/0312771 | A1* | 12/2008 | Sugiura | B25J 9/1666 |
| | | | | 700/259 |
| 2010/0318224 | A1 | 12/2010 | Okuda et al. | |
| 2011/0035051 | A1* | 2/2011 | Kim | B25J 9/1666 |
| | | | | 700/246 |
| 2012/0185091 | A1* | 7/2012 | Field | G05D 1/0044 |
| | | | | 700/254 |
| 2012/0328395 | A1* | 12/2012 | Jacobsen | B25J 3/04 |
| | | | | 414/1 |
| 2014/0067188 | A1* | 3/2014 | Mian | G05D 1/0229 |
| | | | | 701/28 |
| 2014/0074289 | A1* | 3/2014 | Xiao | B25J 9/163 |
| | | | | 700/254 |
| 2015/0063972 | A1 | 3/2015 | Girtman et al. | |
| 2015/0160654 | A1 | 6/2015 | Nakamura et al. | |
| 2015/0306770 | A1* | 10/2015 | Mittal | B25J 5/007 |
| | | | | 700/255 |
| 2016/0023352 | A1* | 1/2016 | Kennedy | B25J 9/06 |
| | | | | 700/259 |
| 2016/0059416 | A1* | 3/2016 | Tian | B25J 9/1666 |
| | | | | 700/253 |
| 2016/0129592 | A1* | 5/2016 | Saboo | G06Q 50/28 |
| 2016/0195390 | A1* | 7/2016 | Nissen | B25J 9/1676 |
| | | | | 702/155 |
| 2016/0325432 | A1* | 11/2016 | Tian | B25J 19/023 |
| 2017/0114553 | A1* | 4/2017 | Raman | E04F 21/1872 |
| 2018/0029797 | A1* | 2/2018 | Hance | B65G 1/1373 |
| 2018/0107175 | A1* | 4/2018 | Ha | B25J 9/1656 |

FOREIGN PATENT DOCUMENTS

| | | |
|---|---|---|
| EP | 2407281 | 1/2012 |
| WO | WO 2012074690 | 6/2012 |
| WO | WO 2012149446 | 11/2012 |

OTHER PUBLICATIONS

International Search Report in PCT Application PCT/EP2016/000543, EPO, dated Aug. 18, 2016.

* cited by examiner

MOBILE ROBOT WITH COLLISION ANTICIPATION

FIELD OF THE INVENTION

The invention relates to autonomously mobile robots such as are used for example in production in factories.

BACKGROUND OF THE INVENTION

U.S. Pat. No. 4,638,445 discloses a mobile platform which is able to move about autonomously. To prevent the platform from striking obstacles as it travels it has arrays of sensors of two kinds. The first sensor array is adapted to detect obstacles situated near to the mobile platform, whereas the second sensor array is adapted to detect far-off obstacles.

EP 2 407 281 B1 discloses a mobile robot having an autonomously mobile chassis and a robot arm mounted thereon. The robot is suited to changing its location automatically in order to perform tasks at different points. The robot may also have a camera which can be used for monitoring for collisions between the robot arm and its surroundings. The document does not say anything about possible reactions by the robot arm if a risk of collision is found in the course of the monitoring.

If the risk of collision is with a human being, the only reaction that is possible is for the entire robot to make an emergency stop. Because the robot cannot predict the next movement by the human being, the only option it has is to come to a standstill in order to reduce the risk of a collision or, if the collision cannot be prevented, to minimise the impetus behind the impact.

If the robot is moving autonomously between stationary obstacles, a risk of collision which exists can be reliably averted by an emergency stop. However, any emergency stop makes a human intervention necessary to remove the cause of the risk of collision and to put the robot back into operation.

WO 2013/171905 A1 (see also US 2015/0160654 as a document in the same family but a post-publication) discloses a mobile robot which is able to sense obstacles, meaning, in this case, passers-by. To prevent a collision with a passer-by, the robot is able to hold a warning means carried by a robot arm into the passer-by's field of vision and to emit a warning signal, to request the passer-by to move out of the way.

WO 2012/149446 A2 discloses a controllable robot having two robot arms. The robot has input means by means of which a user is able to displace the robot and operate the robot arms.

WO 2015/0063972 A1 discloses a mobile robot having a robot arm which is designed to unload cartons automatically from a carton pile onto a conveyor belt.

DE 10 2013 109876 A1 discloses an industrial robot having a permanently installed robot arm. The robot is adapted to control the robot arm in such a way that obstacles can be bypassed.

SUMMARY OF THE INVENTION

The object underlying the invention is therefore to propose a mobile robot which makes possible a collision-free change of location with a minimum of human assistance.

The object of the invention is achieved by a mobile robot having running gear and at least one robot arm mounted on the running gear, a sensor system for sensing obstacles in the surroundings of the robot and a navigation unit for laying down a route on which the running gear is able to travel past the obstacles without any collisions occurring, the navigation unit being adapted to transmit, in advance, information relating to the route laid down to a control unit for the robot arm, to examine the route for a risk of collision between the obstacles and the robot arm and, in the event of there being a risk of collision, to lay down a permissible position for the robot arm by reference to the obstacles sensed and the information transmitted.

The navigation unit may be adapted to transmit the route laid down to the control unit for the robot arm in advance; it is however also conceivable for it to transmit to the control unit merely data derived from the route which is required for assessing a risk of collision.

The navigation unit may for example have a destination co-ordinate to which the running gear is to be moved entered into it by a user. The navigation unit then calculates a route along which the running gear can make its way to the destination co-ordinate. Suitable algorithms for calculating routes are known from the prior art of navigation systems. The navigation unit then generates the commands such as acceleration and angle to be steered required for manoeuvring the running gear to this co-ordinate and passes them on to the running gear for execution. The running gear follows the commands and sets itself in motion in the appropriate way to follow the route.

While the running gear is moving along the route, the sensor system senses obstacles situated in the robot's surroundings and passes their locations on to the control unit. Knowing the route planned by the navigation unit, the control unit is capable of predicting what the locations of the obstacles will be in the future and to assess whether the robot arm will be able to get by the obstacles sensed by the sensor system without colliding with them. If this is not the case, the robot will nevertheless be able to continue along its path, preferably without stopping or slowing down, if the control unit brings the robot arm in good time to the permissible position in which the risk of collision is obviated.

A risk of collision may already be assumed to exist if, in the course of movement past an obstacle along the route, the distance between the robot arm and the obstacle drops below a preset minimum distance.

The sensor system may also supply information on obstacles to the navigation unit. Should an obstacle block the running gear's pre-calculated route and be impossible to avoid, the navigation unit is able to detect this and calculate an alternative route.

The sensor system preferably comprises at least one first sensor to supply information on the surroundings to the navigation unit and at least one second sensor to supply information on the surroundings to the control unit. This simplifies a modular construction for the robot system under which different respective types of robot arm and running gear can be combined with one another, because the first sensor needs only to be optimised, by its positioning and capabilities, for monitoring the running gear and the second needs only to be optimised for monitoring the robot arm and they may each be specific to whatever types of robot arm and running gear are used in the given case.

Use is preferably made in each case of a plurality of first and/or second sensors in order for the surroundings of the running gear and the robot arm to be sensed in their entirety.

What may be used as sensors are for example distance sensors of different types such as cameras and in particular 3D cameras, radar, ultrasonic sensors or capacitively acting proximity sensors.

Because the control unit is able to move the robot arm to a permissible position if there is a risk of a collision with an obstacle, it is not necessary for the robot arm to assume a position within the running gear while the running gear is making a travel movement. What this means is that, at least in the permissible position, the robot arm may be situated outside the running gear. Thus the robot arm can perform tasks while travelling, for example manipulating and in particular carrying about articles situated outside the running gear.

The navigation unit may be adapted to lay down the route without taking into consideration the position of the robot arm. This simplifies the finding of a route which, although it may not necessarily be navigable when the robot arm is in a given position, becomes navigable when the control unit has, as required, moved the robot arm to the position which permits passage past an obstacle. In this way, the navigation unit is also able to plan the route without in any way needing to know what type of robot arm is mounted on the running gear.

For simple mounting or unmounting of the robot arm on or from the running gear, the running gear may have a coupling to which the robot arm can be fastened in such a way as to be exchangeable. A defective robot arm can be changed for an intact robot arm in this way in a maintenance-friendly manner and in a short time.

The navigation unit may be adapted to select the route in such a way that a safe distance is observed between the coupling and the obstacles. Account can be taken in this way of the fact that the parts of the robot arm situated close to the coupling may have only limited freedom of movement and possibly cannot be moved far enough to prevent a collision if there is not a safe distance. In particular, a joint of the robot arm which adjoins the coupling or a sensor belonging to the sensor system should be situated within the safe distance.

To perform given tasks, the robot preferably has a suitable tool such for example as a gripping tool for gripping objects. To prevent not only the tool but also an object gripped by this tool from colliding with the obstacle, the control unit is adapted to lay down the permissible position while allowing for an object held by the gripping tool. In so doing, the control unit allows for the prevention of a collision with the obstacle not only by the object but also by the robot itself.

The control unit is preferably adapted to sense the configuration of the object with the help of the sensor system. By reference to the configuration sensed, the control unit is able to determine the geometry of the object and its location in space and to take these as a basis for calculating the permissible position. As a result, the robot arm is able to assume a position which avoids a collision of the object with the obstacle.

The control unit is preferably capable of stopping the running gear if a permissible position does not exist or if one is not found in good time to allow travel along the route as originally laid down. A permissible position does not exist in particular if the robot arm is unable to assume a position in which there is a large enough distance between the robot arm and the obstacle to allow the robot to get by the latter along the route without there being a collision. When this is the case the navigation unit is able to calculate an alternative route.

BRIEF DESCRIPTION OF THE DRAWINGS

Other features and advantages of the invention can be seen from the following description of embodiments, which refers to the accompanying drawings. In the drawings.

DETAILED DESCRIPTION OF THE PREFERRED EMBODIMENT

Figure 1:
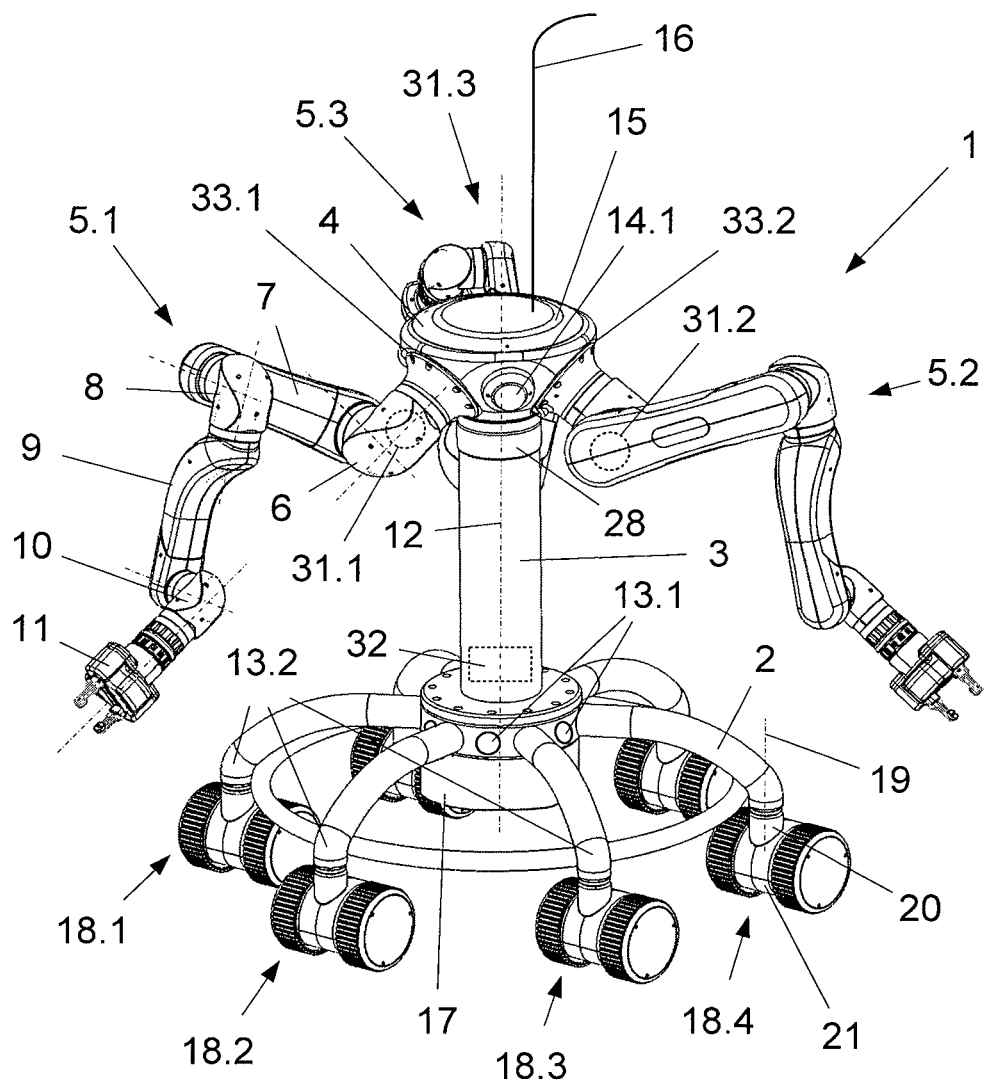
FIG. 1 shows a mobile robot.

FIG. 1 shows a mobile robot 1. The robot 1 has running gear 2 having a plurality of steering rollers 18 which, to allow them to be distinguished, are numbered sequentially from 18.1 to 18.6.

The running gear 2 comprises a central pillar 3 from whose base there extend out radially arms at the ends of which the steering rollers 18 are mounted. Connected to the top end of the pillar 3 by means of a pillar joint 28, to be rotatable on the axis 12, is a head 4. Incorporated in the pillar joint 28 is a drive, preferably electrical, which is able to drive the head 4 in rotation on the axis 12.

The head 4 acts as a mechanical interface for at least one robot arm. In the present embodiment, the robot 1 has three robot arms 5.1, 5.2 and 5.3 which are flange-mounted on corresponding couplings 33 belonging to the head 4 in such a way as to be exchangeable.

The robot arms 5.2 and 5.3 may be different from or also, as in the present embodiment, of the same construction as the robot arm 5.1, and each have three joint units 6, 8 and 10. Each joint unit 6, 8 and 10 has two axes of rotation situated perpendicularly to one another, about each of which a torque generated by a drive incorporated in the joint, and preferably by electric motors, is able to be transmitted to an appropriate interface.

As FIG. 1 shows, one interface of the first joint unit 6 is connected to the coupling 33 in such a way as to be rotatable. The other interface of the rotary joint 6 is connected in such a way as to be rotatable to one end of a lower arm member 7. The other end of the lower arm member 7 is connected in such a way as to be rotatable to one interface of a second joint unit 8. An upper arm member 9 is connected in such a way as to be rotatable to a further interface of the second joint unit 8 and to one interface of a third joint unit 10. A gripping tool 11 is connected in such a way as to be rotatable to the other interface of the third joint unit 10.

Each axis of rotation of the joint units 6, 8 and 10, and the axis 12, endow the robot arm 5.1 with one respective degree of freedom. In this way, the robot arm 5.1 can be moved with seven degrees of freedom in relation to the running gear 2. The same is true of the other robot arms 5.2 and 5.3.

Figure 2:
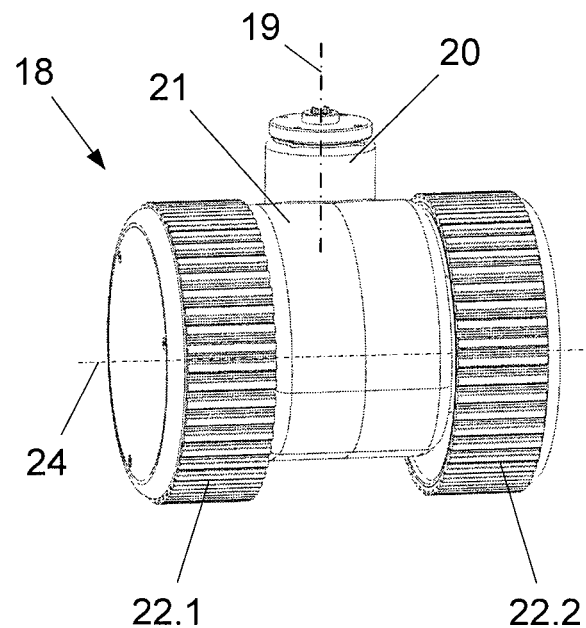
FIG. 2 shows a steering roller.

FIG. 2 shows a steering roller 18 belonging to the running gear 2. Each steering roller 18 has an enclosure 21 which is connected to the running gear 2 in such a way as to be steerable on a steering axis 19. For steering purposes, the steering roller 18 is driven by a steering drive 20 incorporated in the enclosure 21. The steering roller 18 also has a horizontally extending drive axis 21 on which the two wheels 22.1 and 22.2 are arranged to be rotatable.

Figure 3:
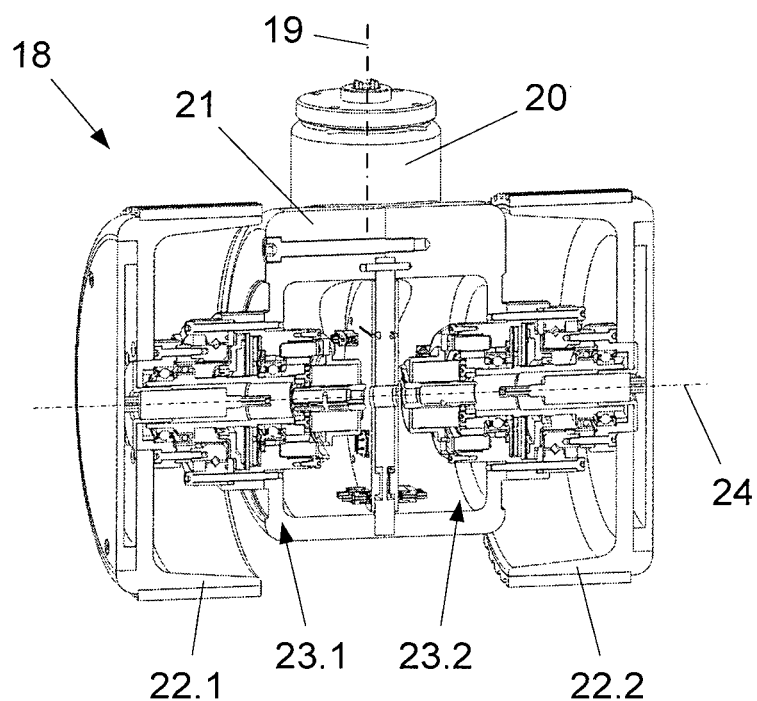
FIG. 3 is a view in section of a driven steering roller.

As FIG. 3 shows, the wheels 22.1 and 22.2 are driven by respective associated drive units 23.1 and 23.2. The drive units 23.1 and 23.2 may each comprise an electric motor, a gearbox, a brake and a drive control system.

The wheels 22.1 and 22.2 of a steering roller 18 may be driven at different torques and/or at different speeds of rotation. In particular, the wheels 22.1 and 22.2 may be driven in different directions of rotation. In this way, a torque may be generated about the steering axis 19 which causes the steering roller to be rotated on this same axis. The steering drive 20 could be dispensed with in this case.

In principle, not all the steering rollers 18.1 to 18.6 need to take the form of driven steering rollers. It would be enough for only one of the steering rollers 18.1 to 18.6 to have a drive and for the rest of the steering rollers to co-rotate with it. Preferably, in the present embodiment, the three steering rollers 18.2, 18.4 and 18.6 take the form of actively driven steering rollers having driven wheels 22.1 and 22.2, and steering rollers 18.1, 18.3 and 18.5 take the form of passive steering rollers having wheels 22.1, 22.2 which co-rotate without being driven.

Housed in the running gear 2 is a navigation unit 32 which is incorporated in, for example, the pillar 3. The navigation unit 32 has an interface (not shown), e.g. a radio interface, via which a destination co-ordinate can be entered by a user. Taking as a basis the current location of the running gear 2, which can be determined by the navigation unit 32 by, for example, GPS (global positioning system), the navigation unit 32 is able to calculate a route 34 to the destination co-ordinate, having recourse if required to a stored map of the surroundings. For this purpose, the navigation unit 32 may run an appropriate algorithm such as is known to be already in use in current navigation systems.

In establishing the route 34, the navigation unit 32 determines from a plurality of possible routes that route which best meets certain criteria such as for example the length of the route or the time it can be expected to take.

The navigation unit 32 then examines whether there are any known obstacles on the route 34 which would stop the running gear 2 from getting past them. The known obstacles may for example be transmitted by radio to the navigation unit 32 via the above interface, or they may have been sensed in the course of earlier movements by the robot 1 and their locations may have been stored in the navigation unit 32. Where an obstacle stops the running gear 2 from travelling past it without a collision occurring, the navigation unit 32 selects an alternative route and examines this in turn until a navigable route has been determined.

Once the navigation unit 32 has determined a route 34 to the destination co-ordinate, it is able to set the running gear 2 in motion and steer the running gear 2 from its current location to the destination co-ordinate. For this purpose, the navigation unit 32 sends appropriate commands to the drive control systems of the driven steering rollers 18.2, 18.4 and 18.6. The drive control systems convert the commands received into appropriate actuation of the steering rollers 18 and specifies for example the acceleration of the individual wheels 22.1 and 22.2 or the angle to be steered on the steering axis 19.

The running gear 2, and hence the robot 1, is thus able to move autonomously to the destination co-ordinate. Even when the navigation unit 32 had already had known obstacles transmitted to it in order to determine the route 34, the possibility cannot be ruled out of these obstacles changing their locations or of additional unknown obstacles cropping up which block the route 34 in an unforeseen way. The possibility also exists of there being both known and unknown obstacles on the route 34 which, although the running gear 2 could travel by them unhindered, would, as the running gear 2 travelled by, cause a collision with one of robot arms 5.1, 5.2 or 5.3 of the robot 1.

Therefore, to prevent a collision with an obstacle under all circumstances, the robot 1 has a sensor system which comprises a plurality of proximity sensors. What are used as' proximity sensors are preferably 3D cameras from whose three-dimensional image information distances from the objects sensed can be determined.

Figure 4:
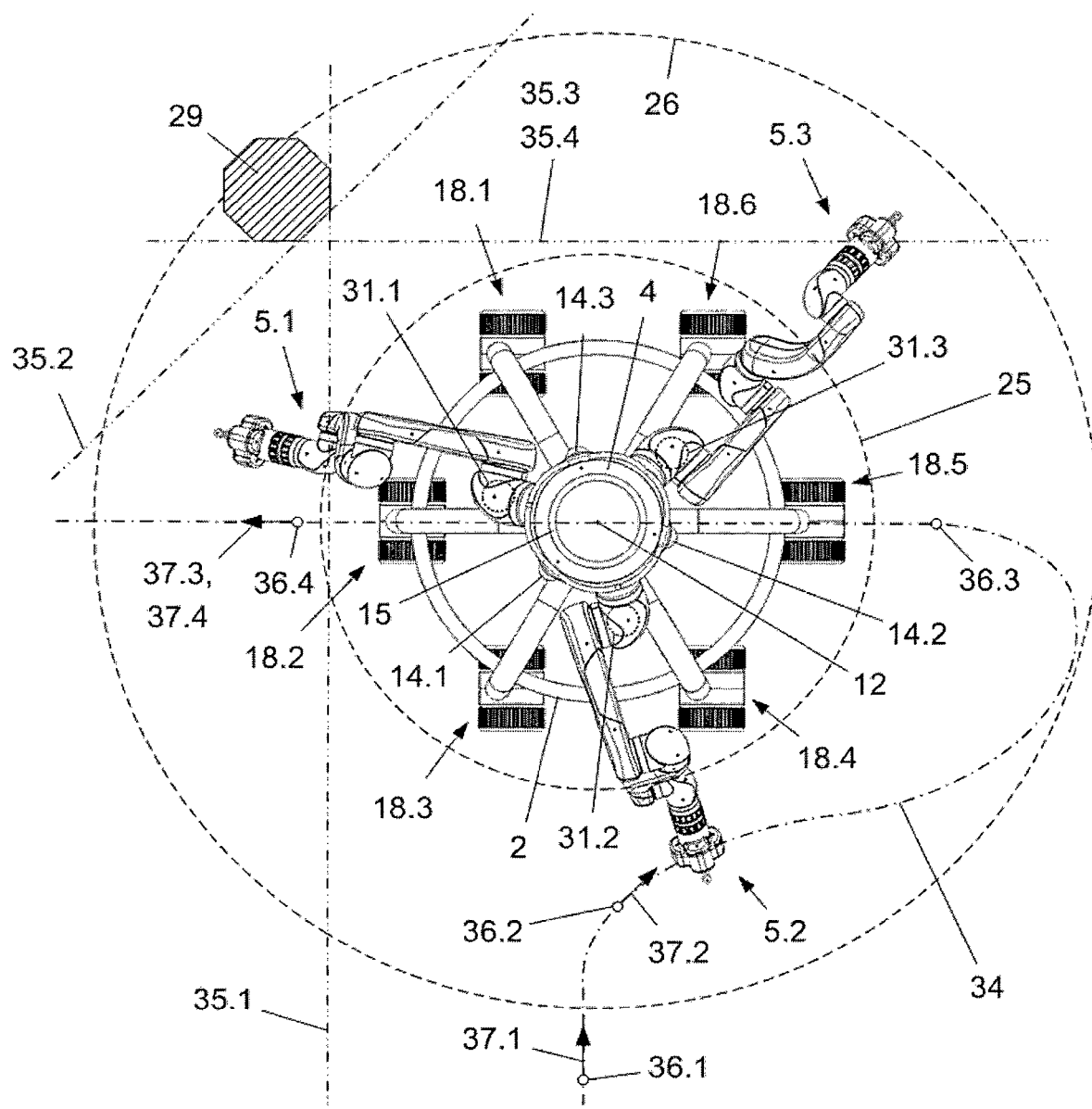
FIG. 4 is a bird's-eye view of the mobile robot.

One group of such proximity sensors 14.1 to 14.3 is mounted in the head 4 to sense the location of an obstacle, such as, say, the obstacle 29 in FIG. 4, which might butt against the robot arms 5.1 to 5.3.

The proximity sensors 14.1 to 14.3 may also serve to sense the positions of the robot arms 5.1 to 5.3. Where a robot arm 5.1 to 5.3 has taken hold of an object with its gripping tool 11, the configuration of the object can be established by means of the proximity sensors 14.1 to 14.3, and the object can be treated as part of the robot arm holding it in the course of the operating process described below.

Each robot arm 5 has a control unit 31 which receives the data determined by the sensor system on the location of the obstacle 29 and, from the navigation unit 32, details of the planned route 34. The control units 31 are numbered sequentially to match the robot arms 5, i.e. control unit 31.1 is incorporated in robot arm 5.1 and control unit 31.2 is incorporated in robot arm 5.2, as is also shown in FIG. 1.

Incidentally, it should be pointed out here that, as a means of distinguishing between identical elements of which more than one is present, their identical reference numerals have had sequential numbering separated by a dot added to them.

At point 36.1 on the route 34, the sensor system senses the obstacle 29. Knowing the direction of travel 37.1 at point 36.1, the control units 31 determine the boundary for collision 35.1 which, in a direction parallel to the direction of travel 37.1, touches the obstacle 29. The control unit 31.1 then finds that the obstacle 29 might be relevant because the robot arm 5.1 controlled by the said control unit 35.1 projects beyond the boundary for collision 35.1. The remaining robot arms 5.2 and 5.3 do not cross the boundary for collision 35.1 and because of this no further consideration is given to them by their control units 31.2 and 33.3.

The control unit 31.1 then begins to examine further points on the route 34 which lies ahead. As FIG. 4 shows, the route 34 at once curves to the right, so that although the distance from the obstacle 29 decreases along the route 34 being examined, for, say, point 36.2 on the route, knowing the direction of travel 37.2, a boundary for collision 35.2 is obtained beyond which the robot arm 5.1 no longer projects. In this way, the navigation unit is able to detect that there is not yet any actual risk of collision and no correction of the position of the robot arm 5.1 is required.

The examination of the route 34 continues while the robot 1 is still at point 36.1, or while it continues to travel, and finally reaches point 36.3. For this point the boundary for collision 35.3 is obtained, which extends in the direction of travel 37.3 and which touches the obstacle 29. With regard to this boundary for collision 35.3, the control unit 31.3 finds that its robot arm 5.3 crosses it.

As examination of the route 34 continues beyond point 36.3, the control unit 31.3 finds that nothing about it changes up to a point beyond point 36.4 but that the distance from the obstacle 29 is subject to a continuous decrease and, at point 36.4, becomes equal to the distance from the boundary for collision 35.4 (which is here coincident with the boundary of collision 35.3 because the route from point 36.3 to 36.4 is a straight line). This being the case, the robot arm 5.3 has in fact to make an avoiding movement to prevent a collision with the obstacle 29.

The control unit 31.3 preferably selects an avoiding movement which can be performed with the degrees of freedom intrinsic to the robot arm 5.3. If such a movement is not found, what may be considered in addition is a rotation of the head 4 on the axis 12 by means of the pillar joint 28; however, such a movement has to be co-ordinated with the other control units 31.1, 31.2 so that, while the robot arm 5.3 is swung out of the region for collision, it is not simply another one that is swung into it.

If however none of the robot arms 5.3 is able to assume a permissible position, the control unit 31.3 takes a safety measure. The control unit 31.3 may for example send to the drive control systems of the driven steering rollers 18.2, 18.4, 18.6 a stop command for the running gear 2 to be brought to a halt before the robot arm 5.3 collides with the obstacle 29.

The control unit 31.3 may also request the navigation unit 32 to determine an alternative route along which the travel can be continued to the destination co-ordinate.

Besides as the group of proximity sensors 14.1 to 14.3, the sensor system may comprise a further group of proximity sensors 13.1 and 13.2 which are arranged on the running gear 2 or the pillar 3 and which sense the locations relating to obstacles situated around the running gear 2. The proximity sensors 13.1 and 13.2 may likewise send the locations of the obstacles sensed to the control units 31.1 to 31.3, thus enabling the control units 31.1 to 31.3 to determine boundaries for collision in relation to these obstacles too by the method explained above.

The locations of the obstacles sensed by the proximity sensors 13.1 to 13.2 are also sent to the navigation unit 32 so that the navigation unit 32 will determine the boundaries for collision by a method similar to that explained above.

Because the boundaries for collision are determined only by the course of route 34 relative to an obstacle such as 29 and are independent of the geometry of the running gear 2 and of the positions of the robot arms 5.1-5.3, in a variant of the invention they may also be determined by the navigation unit 32 in place of the control units 31.1-31.3 and may be transmitted to the latter together with the route 34.

In the same way as the control units 31.1-31.3 do for the robot arms 5.1 to 5.3 monitored by them, the navigation unit 32 examines for the running gear 2, on the basis of the boundaries for collision determined as described above, whether the running gear 2 is able to travel past the obstacles sensed on the route 34, such as for example the obstacle 29 in the present case, without any collisions occurring.

If this is not the case, the navigation unit 32 sends a stop command for the robot 1 to be stopped to the drive control systems of the driven steering rollers 18.2, 18.4, 18.6.

The navigation unit 32 can then determine an alternative route on which the obstacle can be travelled around. On the basis of this new route, the control units 31.1-31.3 then, in the way described above, have to re-check whether a risk of collision exists for their robot arms 5.1-5.3.

To assess whether the running gear 2 is able to pass by an obstacle without a collision occurring, the navigation unit 32 would, strictly speaking, have to take account of the orientation of each individual steering roller 18. To reduce the cost and complication of calculation, the assessment may also be made on the basis of a virtual envelope 25 beyond which the steering rollers 18 do not project in any orientation. In addition to the running gear 2, the envelope 25 may also enclose parts of the robot arms 5.1-5.3 which are incapable of making avoiding movements or are capable of doing so to only a limited degree, namely their joint units 6 which are flange-mounted on the coupling 33.

In addition to checking for any transgression of a safe distance by the running gear 2, the control units 31.1 to 31.3 may also check whether an obstacle transgresses a second safe distance 26 (see FIG. 4). As a result, the robot 1 is able to react completely spontaneously particularly to obstacles which are in motion and which for example get in the way of the robot 1 without this being foreseen. The safe distance 26 is selected to be sufficiently large to extend beyond the reach which the robot arms 5.1 to 5.3 have in their fully extended position. If for example an obstacle 29 penetrates within this safe distance 26, the running gear 2 is decelerated to prevent a robot arm 5.1 to 5.3 from colliding with an obstacle 29, in good time before the robot arm has assumed a permissible position.

Should the moving obstacle 29 come to stand still in front of the robot 1, a boundary for collision can be determined by the method explained above to check whether the robot 1 is able to travel past the now stationary obstacle without a collision occurring.

It is not essential for the running gear 2 to be stopped or decelerated while a robot arm 5.1 to 5.3 is moving to a permissible position; instead it can continue to travel along the route 34 without any changes for as long as enough room is left for the robot arms 5.1 to 5.3 to move to a permissible position without any collisions occurring. The information required for this purpose may be determined from, inter alia, the data obtained from the proximity sensors 13.1, 13.2 and/or 14.1 to 14.3.

To allow good image information to be obtained in dark conditions from the proximity sensors 13.1, 13.2, 14.1 to 14.3 in the form of 3D cameras, the robot 1 may comprise a light source which lights up the environment around the robot 1. The light source may for example be incorporated in the head 4.

For the supply of energy, the robot 1 has a power take-off means 16 via which electrical energy can be fed to the robot 1. The power take-off means 16 may for example be connected to a mains supply (not shown), situated in the ceiling, which transmits the electrical power. Alternatively, the robot 1 may be supplied via an induction loop buried in the floor.

To enable regions of the route 34 where there is no external energy supply to be crossed, the robot 1 may comprise an energy storage means 17. The energy storage means 17 may be fastened to the running gear 2 and may comprise a storage battery to store and dispense electrical energy. The energy storage means 17 can be charged as the robot 1 is being supplied by an external energy supply.

The robot 1 may also comprise a signal emitter 15 which may for example be incorporated in the head 4. Certain states of the robot 1 or warning messages can be indicated by means of the signal emitter 15. The signal emitter 15 is preferably of an optical nature and may light up in different colours. As well as this the robot 1 may also comprise an acoustic signal emitter. What may be indicated are for example the "faulty energy supply" state, the direction of travel 37 or detection of a drop below the safe distance 26.

The sensor system may also comprise proximity sensors which are incorporated in the gripping tool and which supply additional information to the control units 31.1 to 31.3 and navigation unit 32 respectively.

REFERENCE NUMERALS

1 Robot
2 Running gear
3 Pillar
4 Head
5.1 Robot arm
5.2 Robot arm
5.3 Robot arm
6 Joint unit
7 Arm member
8 Joint unit 9 Arm member
10 Joint unit
11 Gripping tool
12 Axis
13 Proximity sensor
14 Proximity sensor
15 Signal emitter
16 Power take-off means
17 Energy storage means
18 Steering roller
19 Steering axis
20 Steering drive
21 Enclosure
22.1 Wheel
22.2 Wheel
23.1 Drive unit
23.2 Drive unit
24 Drive axis
25 Safe distance
26 Safe distance
27 (Not used)
28 Pillar joint
29 Obstacle
30 (Not used)
31 Control unit
32 Navigation unit
33 Coupling
34 Route
35 Boundary for collision
36 Point on route
37 Direction of travel

The invention claimed is:

1. A mobile robot (1) having energizable and steerable running gear (2) and at least one robot arm (5.1, 5.2, 5.3) mounted on the energizable and steerable running gear (2), a proximity sensor system comprising a plurality of proximity sensors, said proximity sensor system configured for sensing obstacles (29) in the surroundings of the robot (1) and a navigation path controller (32), responsive to said proximity sensor system sensed obstacles (29) and to destination location coordinate data and current location coordinate data, for calculating a route (34) on which the energizable and steerable running gear (2) is able to travel from said current location to said destination location past the sensed obstacles (29) without any collisions occurring, characterised in that the navigation path controller (32) is adapted to transmit, prior to energizing said energizable and steerable running gear (2) of said mobile robot (1), information relating to the calculated route (34) to a robot navigation controller (31) for each of the at least one robot arm (5.1, 5.2, 5.3), and wherein the robot navigation controller (31.1, 31.2, 31.3) is responsive to said proximity sensor system and to said calculated route (34), for examining the calculated route (34) for a risk of collision between the sensed obstacles (29) and each of the at least one robot arm (5.1, 5.2, 5.3) and responsive to examining the calculated route (34) for a risk of collision between the sensed obstacles (29) and a current position of each of the at least one robot arm (5.1, 5.2, 5.3), said robot navigation controller (31.1, 31.2, 31.3) configured for determining that there is a risk of a collision between the sensed obstacles (29) and a current position of each of the at least one robot arm (5.1, 5.2, 5.3) as said energizable and steerable running gear (2) of said mobile robot (1) moves said mobile robot (1) along said calculated route (34), and responsive to said determination, for calculating a permissible position for each of the robot arm (5.1, 5.2, 5.3) with reference to the sensed obstacles (29) as said energizable and steerable running gear (2) of said mobile robot (1) moves said mobile robot (1) along said calculated route (34) and for causing said at least one robot arm (5.1, 5.2, 5.3) to move into said permissible position as said energizable and steerable running gear (2) of said mobile robot (1) moves said mobile robot (1) along said calculated route (34).

2. The mobile robot (1) according to claim 1, characterised in that the proximity sensor system comprises at least one first proximity sensor configured to supply information on current surroundings to the navigation path controller and at least one second proximity sensor configured to supply information on the current surroundings to the robot navigation controller (31.1, 31.2, 31.3).

3. The mobile robot (1) according to claim 1, characterised in that the robot arm (5.1, 5.2, 5.3) is disposed outside a diameter of the energizable and steerable running gear (2), at least in the permissible position.

4. The mobile robot (1) according to claim 1, characterised in that the navigation path controller (32) is adapted to calculate the route (34) without taking into consideration the current position of the robot arm (5.1, 5.2, 5.3).

5. The mobile robot (1) according to claim 1, characterised in that the robot arm (5.1, 5.2, 5.3) is mounted on a removable coupling (33) disposed on the energizable and steerable running gear (2).

6. The mobile robot (1) according to claim 5, characterised in that the navigation path controller (32) is adapted to calculate the route (34) in such a way that a safe distance (25) is observed between the removable coupling (33) and the sensed obstacles (29).

7. The mobile robot (1) according to claim 1, characterised in that the robot arm (5.1, 5.2, 5.3) includes a gripping tool (11) and the robot navigation controller (31.1, 31.2, 31.3) is adapted to calculate lay down the permissible position while taking account of an object held by the gripping tool (11).

8. The mobile robot (1) according to claim 7, characterised in that the robot navigation controller (31.1, 31.2, 31.3) is adapted to sense the configuration of the object held by the gripping tool (11) with the help of the proximity sensor system.

9. The mobile robot (1) according to claim 1, characterised in that the permissible position is a position of the robot arm (5.1, 5.2, 5.3) in which the robot arm (5.1, 5.2, 5.3) passes by the sensed obstacle (29) on the celcuated route (34), without touching the sensed obstacle.

10. The mobile robot (1) according to claim 9, characterised in that the robot navigation controller (31.1, 31.2, 31.3) is capable of de-energizing the energizable and steerable running gear (2) if a permissible position does not exist.

* * * * *